H. C. UTTECH AND A. E. OHRMUNDT.
OIL RETAINER.
APPLICATION FILED SEPT. 27, 1919.

1,353,095.

Patented Sept. 14, 1920.

WITNESSES

INVENTORS.
H. C. Uttech.
Arthur E. Ohrmundt.
ATTORNEYS

UNITED STATES PATENT OFFICE.

HENRY C. UTTECH, OF LEBANON, AND ARTHUR E. OHRMUNDT, OF MILWAUKEE, WISCONSIN.

OIL-RETAINER.

1,353,095.

Specification of Letters Patent.

Patented Sept. 14, 1920.

Application filed September 27, 1919. Serial No. 326,901.

*To all whom it may concern:*

Be it known that we, HENRY C. UTTECH and ARTHUR E. OHRMUNDT, citizens of the United States, and residents, respectively, of Lebanon, in the county of Dodge and State of Wisconsin, and Milwaukee, in the county of Milwaukee and State of Wisconsin, have invented a new and Improved Oil-Retainer, of which the following is a full, clear, and exact description.

This invention relates to improvements in oil retainers, an object of the invention being to provide an improved construction and arrangement of oil retainer in connection with a gear case or machine element of any character, which permits a free lubrication and yet which maintains a leak proof gasket around the shaft.

A further object is to provide improvements of the character stated which dispense with the necessity for the ordinary stuffing box and consequent frictional engagement with the shaft.

With these and other objects in view, the invention consists in certain novel features of construction and combinations and arrangements of parts, as will be more fully hereinafter described and pointed out in the claims.

Figure 1:
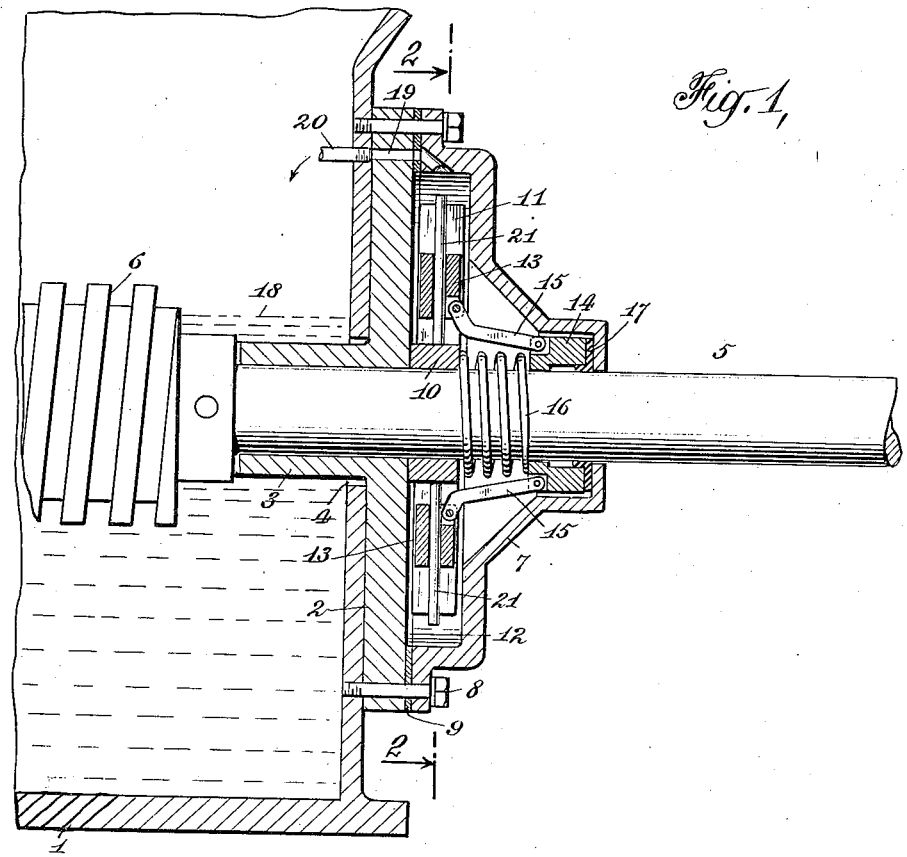
Figure 1 is a view in section illustrating our improvements.
Figure 2:
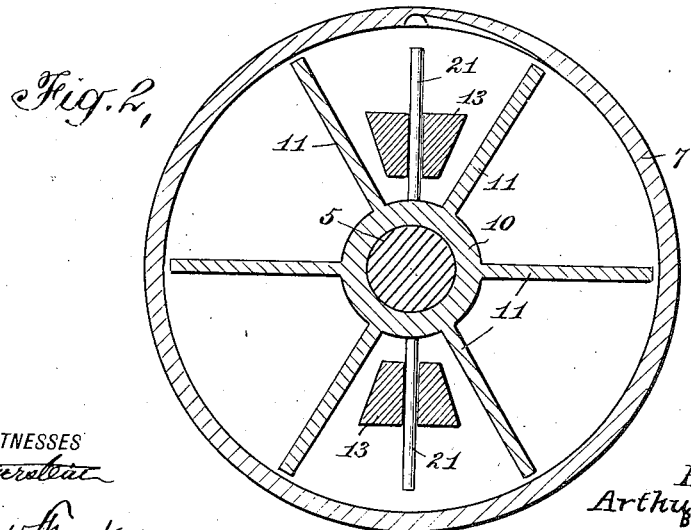
Fig. 2 is a view in transverse section on the line 2—2 of Fig. 1.

1 represents a gear case of any desired construction, having a disk 2 secured to the casing and provided with a bearing sleeve 3 projecting through an opening 4 in the wall of the casing and providing a mounting for a shaft 5.

In the present instance we have shown a worm 6 secured on the shaft 5 in casing 1 as a driving means, but it is obvious that the invention is not limited to any particular form of gearing nor to the particular use of the apparatus.

7 represents a housing which is secured to the disk 2 and to the casing 1 by means of screws 8, with a gasket 9 interposed between the housing and disk to render oil-tight the chamber formed by the housing and disk.

A rotor 10 is secured on the shaft 5 within the housing 7 and is provided with radial blades 11 which move freely within an annular space 12 in the housing.

Radial pins 21 are carried by the rotor 10 and on the pins perforated weights 13 are positioned. A collar 14 is located around the shaft 5 and is connected by links 15 with the weights 13.

A coiled spring 16 is positioned around the shaft 5 between the collar 14 and the hub of the rotor. This spring normally exerts a pressure on the collar 14 and forces the same against a gasket 17 located around the shaft 5, and against the end of the housing, rendering the housing oil-tight at this point.

The casing 1 is adapted to contain oil 18 up to the level shown and this oil feeds through the bearing sleeve 3 into the housing 7. A return port 19 is provided in the housing 7, disk 8 and casing 1, and a pipe 20 may be connected to this port for conveying the oil to any point desired.

The operation is as follows:

When the shaft 5 is stationary, the spring 16 presses the collar 14 against the gasket 17 and maintains the housing oil-tight, serving the purpose of a stuffing box. When the shaft 5 is revolved the rotor 10 operates by centrifugal force to throw the oil out of the housing 7 through the port 19 and back into the casing or to any other point of use. This movement of the rotor causes the weights 13 to move outwardly, and through the medium of the links 15 operates to move the collar 14 away from the gasket 17, thus relieving pressure on the gasket and consequent pressure on the shaft 5. The weights 13 and links 15 therefor operate as a governor to automatically relieve pressure on the gasket 17 when the shaft 5 is revolved, and the spring 16 insures such pressure when the shaft is at a standstill. The housing is prevented from an accumulation of oil during the running of the shaft by means of the rotor so that leakage is prevented and frictional engagement reduced to a minimum.

Various slight changes might be made in the general form of the parts described without departing from our invention, and hence we do not limit ourselves to the precise details set forth, but consider ourselves at liberty to make such slight changes and alterations as fairly fall within the spirit and scope of the appended claims.

We claim:

1. The combination with a housing adapted to receive a shaft therein, of a gasket in the housing adapted to surround the shaft, elastic means for pressing the gasket into engagement with the shaft, and centrifugal means automatically controlled by the rotation of the shaft for withdrawing the gasket pressing means.

2. The combination with a housing adapted to receive a shaft projecting therethrough, a gasket in the housing adapted to surround the shaft, and a sliding collar around the shaft in the housing engaging the gasket, of a rotor in the casing adapted to be turned by the shaft, and a governor operated by the rotor and controlling the position of the collar.

3. The combination with a housing adapted to receive a shaft, a gasket in the housing adapted to surround the shaft, and a rotor in the housing adapted to be turned by the shaft, of a gasket compressing member around the shaft in the housing, and means controlled automatically by the rotor to govern the position of the gasket compressing member.

4. The combination with a casing adapted to contain oil, of a shaft projecting into the casing, a housing secured to the casing and having an opening therein through which the shaft projects, a gasket around the shaft in the housing, a rotor on the shaft, a spring pressed collar on the shaft adapted to engage the gasket, and a governor carried by the shaft and adapted to draw the collar away from the gasket when the shaft is turned.

5. The combination with a casing adapted to contain oil, of a shaft projecting into the casing, a housing secured to the casing and having an opening therein through which the shaft projects, a gasket around the shaft in the housing, a rotor on the shaft, radially movable weights carried by the rotor, a collar on the shaft adapted to engage the gasket, links connecting the weights and the collar, and a spring interposed between the rotor and the collar.

6. The combination with a casing adapted to contain oil, of a shaft projecting into the casing, a housing secured to the casing and having an opening therein through which the shaft projects, a gasket around the shaft in the housing, a rotor on the shaft, said housing adapted to receive oil from the casing and having a return port to the casing, said rotor adapted to force the oil from the housing through said port, a collar around the shaft, a spring pressing said collar against the gasket, radial pins carried by the rotor, perforated weights on the pins, and links connecting the weights with said collar.

HENRY C. UTTECH.
ARTHUR E. OHRMUNDT.